United States Patent
Drzymala et al.

(10) Patent No.: US 10,331,926 B1
(45) Date of Patent: Jun. 25, 2019

(54) BI-OPTIC BARCODE READER

(71) Applicant: SYMBOL TECHNOLOGIES, LLC, Lincolnshire, IL (US)

(72) Inventors: Mark Drzymala, Saint James, NY (US); Edward Barkan, Miller Place, NY (US); Darran Michael Handshaw, Sound Beach, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 0 days.

(21) Appl. No.: 15/844,880

(22) Filed: Dec. 18, 2017

(51) Int. Cl.
*G06K 7/10* (2006.01)
*G07G 1/00* (2006.01)

(52) U.S. Cl.
CPC ....... *G06K 7/10831* (2013.01); *G06K 7/1096* (2013.01); *G06K 7/10861* (2013.01); *G07G 1/0045* (2013.01)

(58) Field of Classification Search
USPC .......................... 235/462.01, 462.14, 462.43
See application file for complete search history.

(56) References Cited

U.S. PATENT DOCUMENTS

| | | | | |
|---|---|---|---|---|
| 2008/0011857 A1* | 1/2008 | Detwiler | ............ | G06K 7/10564 235/462.38 |
| 2010/0127082 A1* | 5/2010 | Drzymala | .......... | G06K 7/10722 235/462.41 |
| 2013/0256395 A1* | 10/2013 | Barkan | .................. | G06Q 20/00 235/375 |
| 2014/0183262 A1* | 7/2014 | Wittenberg | .......... | G06K 7/1096 235/440 |
| 2017/0011242 A1* | 1/2017 | Detwiler | .............. | G02B 26/105 |

* cited by examiner

*Primary Examiner* — Tuyen K Vo
(74) *Attorney, Agent, or Firm* — Yuri Astvatsaturov (57) ABSTRACT

Embodiment of the present invention generally relate to bi-optic barcode readers. In an embodiment, the disclosure describes a barcode reader for use in a checkout workstation having a surface. The barcode reader includes: a lower housing portion having a top portion; a first optically transmissive window positioned in the top portion, a top surface of the first optically transmissive window defining a horizontal plane, the top portion of the lower housing being substantially parallel with the surface of the checkout workstation when the barcode reader is used in the checkout workstation; a raised housing portion having a second optically transmissive window, the raised housing portion extending at least partially above the top portion; and a PCB positioned substantially upright relative to the horizontal plane, the PCB having a first imaging assembly and a decode assembly, the barcode reader having no other printed circuit boards with another imaging assembly.

21 Claims, 7 Drawing Sheets

BI-OPTIC BARCODE READER

BACKGROUND

Venues, such as retail stores, often use bi-optic barcode readers in the checkout process to read barcodes affixed to products being checked out. Bi-optic barcode readers are typically formed with a horizontal window and a vertical window arranged in a way that image data can be captured by internal imaging components (e.g., imaging sensors) through either of the two windows.

Normally, these bi-optic readers position multiple imaging sensors on multiple printed circuit boards disposed throughout the interior of the reader housing with various mirrors redirecting the imagers' fields of view (FOV) through the appropriate windows. Such designs involve complicated circuitry and a relatively large number of mirrors, complicating the design, increasing the potential for damage, and increasing overall development and manufacturing costs associated with the reader. Other bi-optic readers have implemented designs where all imaging components are positioned on circuit components that are positioned horizontally relative to the overall orientation of the readers. Though somewhat effective at reducing the cost and complexity, these designs still rely on a relatively large number of mirrors to establish a sufficient FOV path length and appropriately position the FOV.

Accordingly, there remains a demand for continued design improvements in the field of bi-optic barcode readers that address the need to reduce complexity, leading further to increased robustness and lower cost.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

In an embodiment, the present invention is a barcode reader for use in a checkout workstation having a surface for placement of products to be checked out. The barcode reader includes: a lower housing portion having a top portion; a first optically transmissive window positioned in the top portion of the lower housing, a top surface of the first optically transmissive window defining a horizontal plane, the top portion of the lower housing being substantially parallel with the surface of the checkout workstation when the barcode reader is used in the checkout workstation; a raised housing portion having a second optically transmissive window, the raised housing portion extending at least partially above the top portion of the lower housing; and a printed circuit board (PCB) positioned substantially upright relative to the horizontal plane, the PCB having a first imaging assembly and a decode assembly, the barcode reader having no other printed circuit board with another imaging assembly.

In a variation of this embodiment: the PCB further includes a second imaging assembly; the first imaging assembly includes a first FOV; the second imaging assembly includes a second FOV; at least a portion of the first FOV is directed to pass through at least one of the first optically transmissive window and the second optically transmissive window; and at least a portion of the second FOV is directed to pass through at least one of the first optically transmissive window and the second optically transmissive window.

In another embodiment, the present invention is a bi-optic barcode reader that includes: a lower housing portion having a top portion with a generally horizontal window; a raised housing portion having a generally upright window; a printed circuit board (PCB) positioned substantially upright relative to the generally horizontal window, the PCB having an imaging assembly with a first FOV and a decode assembly, the bi-optic barcode reader having no other printed circuit board with another imaging assembly; and a mirror arrangement configured to split the first FOV into a first sub-FOV and a second sub-FOV, redirect the first sub-FOV through the generally horizontal window, and redirect the second sub-FOV through the generally upright window.

In a variation of this embodiment, the mirror arrangement redirects the first sub-FOV through the generally horizontal window via only a first mirror, and the mirror arrangement further redirects the second sub-FOV through the generally upright window via only a second mirror and a third mirror, the redirecting the second sub-FOV including splitting the second sub-FOV from the first FOV.

In yet another embodiment, the present invention is a bi-optic barcode reader that includes: a lower housing portion having a top portion with a generally horizontal window; a raised housing portion having a generally upright window; a printed circuit board (PCB) positioned substantially upright relative to the generally horizontal window, the PCB having a first imaging assembly with a first FOV and a second imaging assembly with a second FOV, the bi-optic barcode reader having no other printed circuit board with another imaging assembly; and a mirror arrangement configured to: redirect the first FOV through the generally horizontal window; split the second FOV into a first sub-FOV and a second sub-FOV; and redirect the first sub-FOV and the second sub-FOV through the generally upright window.

In a variation of this embodiment, the mirror arrangement: redirects the first FOV through the generally horizontal window via only a first mirror; splits the first sub-FOV from the second FOV and redirects the first sub-FOV through the generally upright window via only a second mirror and a third mirror; and splits the second sub-FOV from the second FOV and redirects the second sub-FOV through the generally upright window via only a fourth mirror and a fifth mirror.

Figure 1:
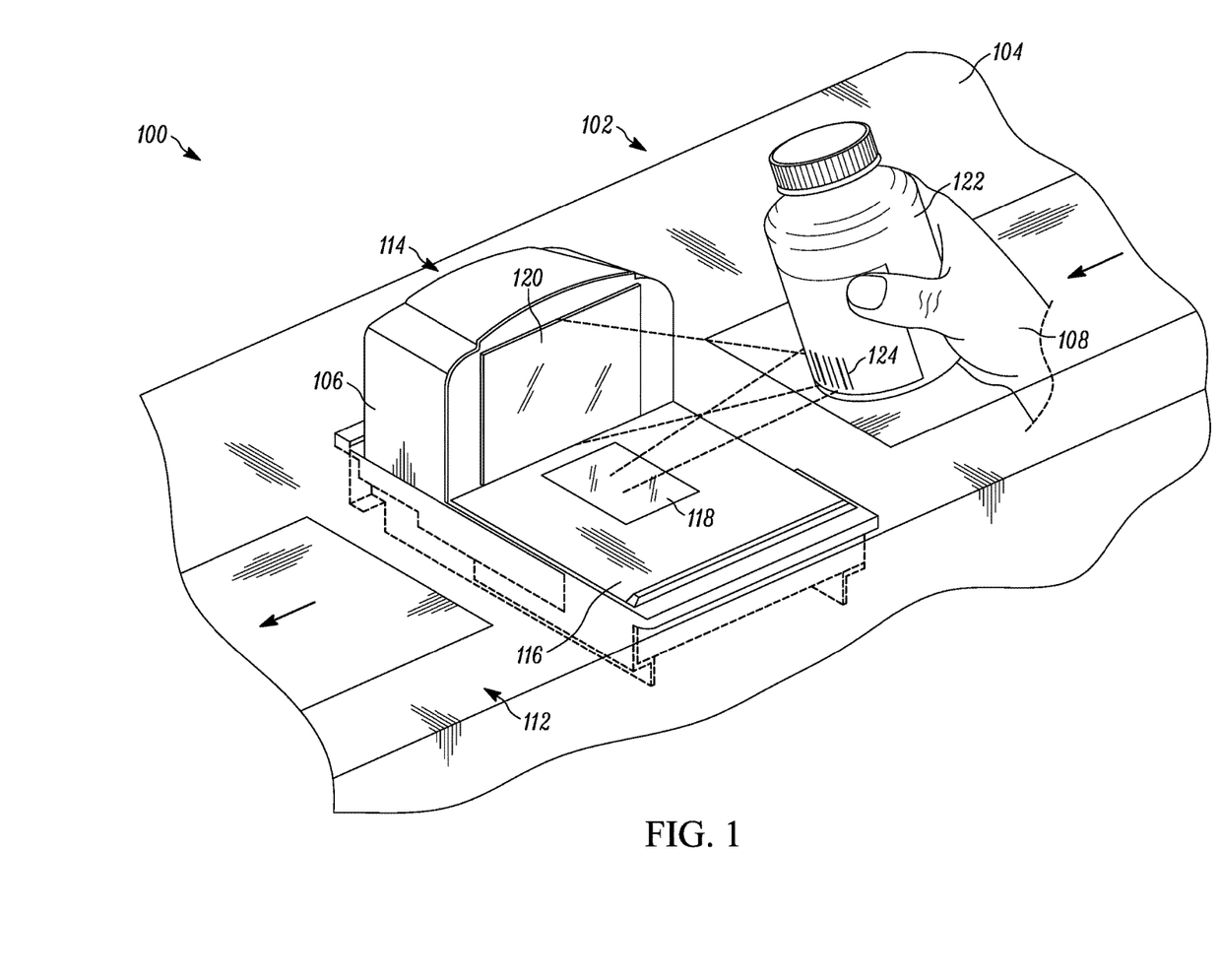
FIG. 1 illustrates a perspective view of a checkout workstation in accordance with an embodiment of the present invention.

Referring now to the drawings, FIG. 1 illustrates a perspective view of a point-of-sale (POS) system 100 having a workstation 102 with a counter 104 and a bi-optical (also referred to as "bi-optic") barcode reader 106 positioned partially within the workstation 102. The POS system 100 is often managed by a store employee such as a clerk 108. However, in other cases the POS system 100 may be a part of a so-called self-checkout lane where instead of a clerk, a customer is responsible for checking out his or her own products.

The barcode reader 106 includes a lower housing 112 and a raised housing 114. The lower housing 112 includes a top portion 116 with a first optically transmissive window 118 positioned therein along a generally horizontal plane relative to the overall configuration and placement of the reader 106. In some embodiments, the top portion may include a removeable or a non-removable platter (e.g., a weighing platter). The top portion 116 can also be viewed as being positioned substantially parallel with the counter 104 surface. It's worth noting that while, in FIG. 1, the counter 104 and top portion 116 are illustrated as being about co-planar, that does not have to be the case for the platter and the counter to be considered substantially parallel. In some instances, the counter 104 may be raised or lowered relative to the top surface of the top portion 116 where the top portion 116 is still viewed as being positioned substantially parallel with the counter 104 surface. The raised housing 114 is configured to be extend above the top portion 116 and includes a second optically transmissive window 120 positioned in a generally upright plane relative to the top portion 116 and/or the first optically transmissive window 118. Note that references to "upright" include, but are not limited to, vertical. Thus, something that is upright may deviate from a vertical axis/plane by as much as 45 degrees.

In practice, products, such as for example the bottle 122, are swiped past the reader 106 such that a barcode 124 associated where the product 122 is digitally read through at least one of the first and second optically transmissive windows 118, 120. This is particularly done by positioning the product 122 within the fields of view (FsOV) of the digital imaging sensor(s) housed inside the reader 106 to allow the sensor(s) to capture image data and transmit that data for further processing.

Figure 2:
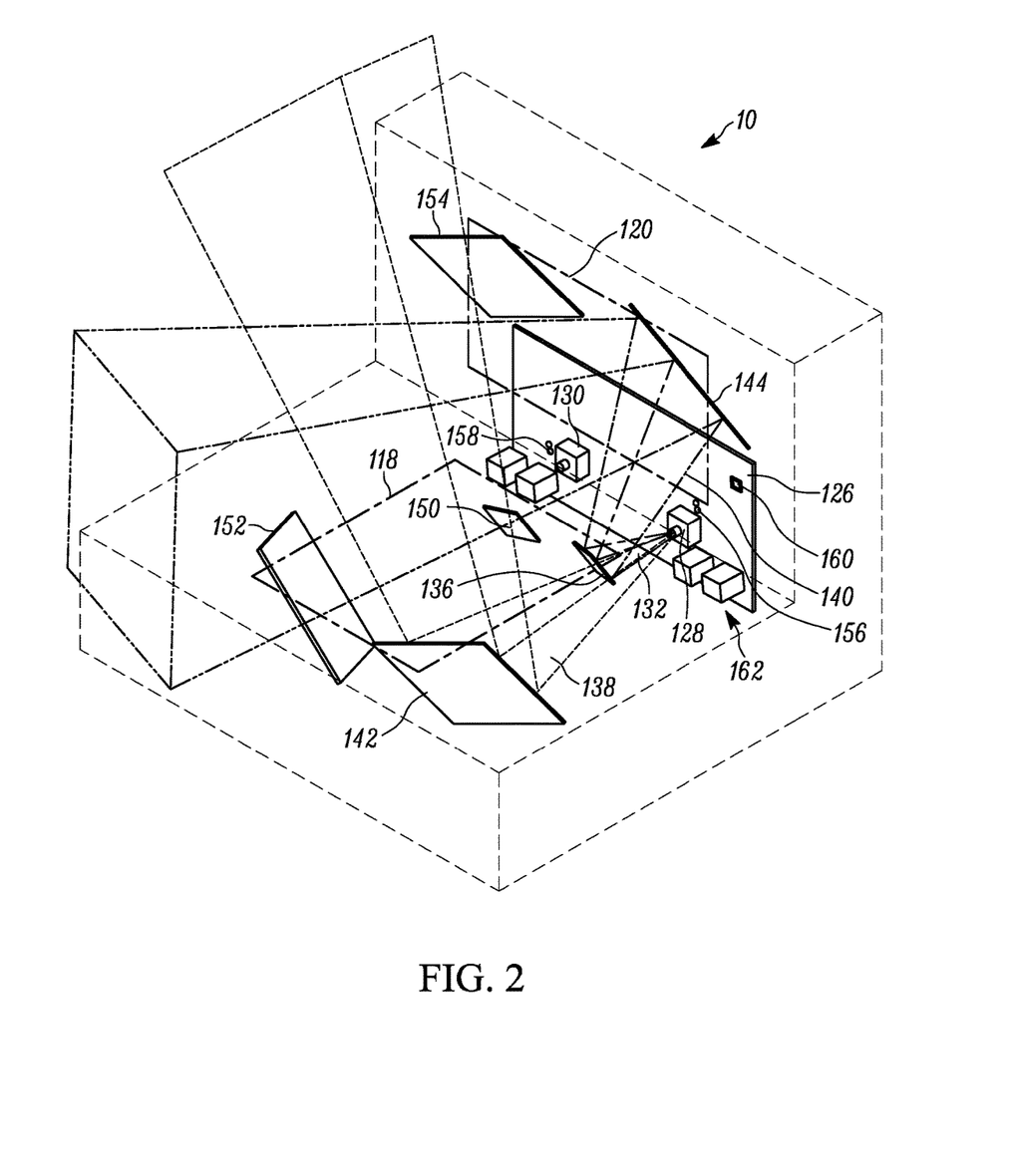
FIG. 2 illustrates a front right perspective view of a barcode reader in accordance with an embodiment of the present invention.
Figure 3:
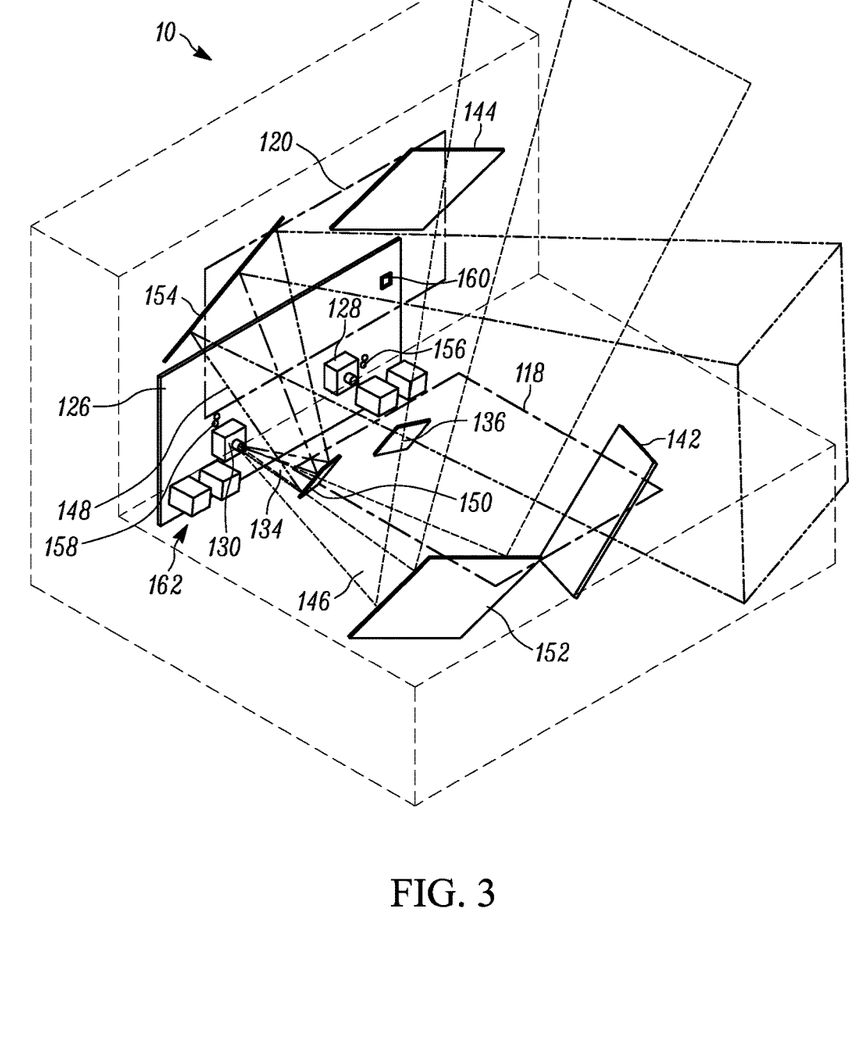
FIG. 3 illustrates a front left perspective view of the barcode reader of FIG. 2.
Figure 4:
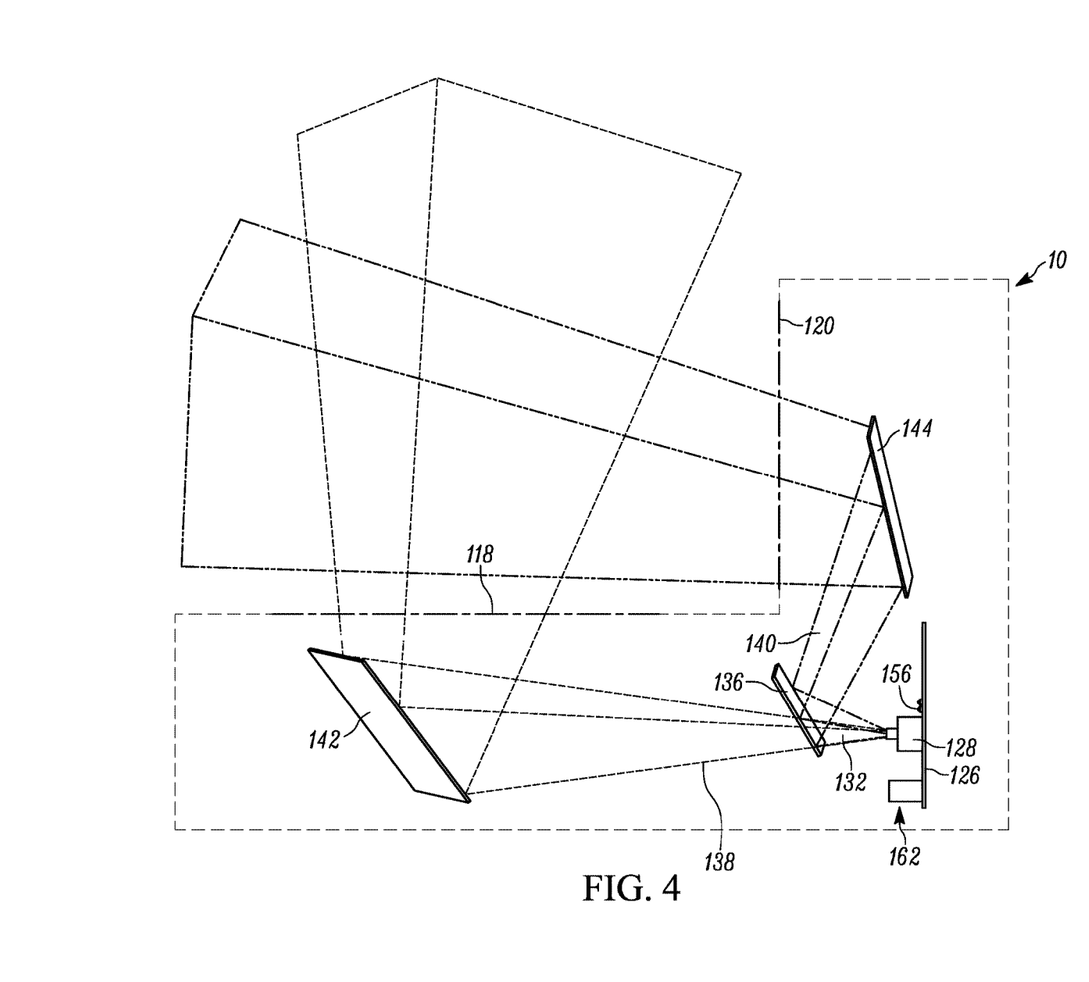
FIG. 4 illustrates a right side perspective view of the barcode reader of FIG. 2.

Referring to FIGS. 2-4, shown therein is an embodiment of a component arrangement 10 for use in a barcode reader 106. For sake of clarity, FIG. 2 illustrates a front perspective view of the components and some of the FsOV from a first side and FIG. 3 illustrates a front perspective view of the components and some of the FsOV from another side. In this embodiment, the reader 106 includes a printed circuit board (PCB) 126 with a first imaging assembly 128 and a second imaging assembly 130. Each imaging assembly 128, 130 includes an imaging sensor having a plurality of photosensitive elements that define a substantially flat surface along with other components like a housing and lens(es) for capturing image data over a FOV. The arrangement and configuration of these components, in particular the imaging sensor and the lens(es), define a specific FOV for each of the imaging assemblies. As such, the first illumination assembly 128 and its imaging sensor are configured to capture image data over a first FOV 132 that is centered about a central axis that is normal to the image sensor's substantially flat surface. Similarly, the second imaging assembly 130 and its imaging sensor are configured to capture image data over a second FOV 134 that is centered about a central axis that is normal to the image sensor's substantially flat surface. It should be noted that while the image sensors are described as capturing image data over the first and second FsOV, each of those FsOV can be split into multiple sub-FsOV with any one of those being redirected into any desired direction. Data captured through the sub-FsOV of a respective image sensor would still be considered image data that is captured over that imager's FOV.

To achieve desired functionality, a mirror arrangement is used to alter and redirect the original FsOV 132, 134. With respect to the first FOV 132, a splitter mirror 136 is positioned to redirect a part of the first FOV 132, splitting the first FOV 132 into a first sub-FOV 138 and a second sub-FOV 140. Thereafter, the mirror arrangement further includes a fold mirror 142 to redirect the first sub-FOV 138 to pass through the first optically transmissive window 118 in a generally upright direction and a fold mirror 144 to redirect the second sub-FOV 140 to pass through the second optically transmissive window 120 in a generally horizontal direction. The precise angle and position of the mirrors can be varied to achieve a desired FOV path direction. In the currently described embodiment, fold mirrors 142 and 144 are positioned such that the first sub-FOV 138 and the second sub-FOV 140 intersect above the top portion 116 and in the product-scanning region (i.e., the general area where products 122 are expected to be presented for image capture by the barcode reader 106). In some cases, the mirrors can be arranged to cause the first sub-FOV and the second sub-FOV to intersect partially. In other instances, the mirrors can be arranged to cause the first sub-FOV and the second sub-FOV to intersect fully. In still other instances, the mirrors can be arranged to cause the centroidal axis of each of the first sub-FOV and the second sub-FOV to intersect with or without regard for the cross-sectional dimensions of the FsOV.

Additionally, the angle and position of the mirrors can be varied to achieve a desired FOV path distance to a chosen point. This can be particularly important for focusing maintaining the scanned products in focus for the imaging assemblies. In case of the embodiment shown in FIGS. 2 and 3, the splitter mirror 136 and the two fold mirrors 142, 144 are arranged such that the a first distance, measured along the first sub-FOV, from the first imaging sensor to an intersection of the first sub-FOV and the second sub-FOV is approximately equal to a second distance, measured along the second sub-FOV, from the first imaging sensor to the intersection of the first sub-FOV and the second sub-FOV. When measuring along a particular sub-FOV, the distance can be measured along the respective sub-FOV's centroidal (also referred to as "central") axis. Additionally, the intersection of the first sub-FOV and the second sub-FOV can be considered to be the point where both centroidal axis intersect.

In other embodiments, the first sub-FOV includes a first central axis with a first point in a product-scanning region and the second sub-FOV includes a second central axis with a second point in the product-scanning region such that the first point is nearest the second central axis in the product-scanning region and the second point is nearest the first central axis in the product-scanning region. In this case, the mirror arrangement is configured such that a first distance, measured along the first central axis, from the substantially flat surface of the imaging sensor to the first point is substantially equal to a second distance, measured along the second central axis, from the substantially flat surface of the imaging sensor to the second point.

With respect to the second FOV 134, it is a mirrored representation of the first FOV 132 from the point of origination to the point of intersection. That is, referring to FIG. 3, the second FOV 134 is split into a third sub-FOV 146 and a fourth sub-FOV 148 via a splitter mirror 150, with the third sub-FOV 146 being redirected to pass through the first optically transmissive window 118 in a generally upright direction by a fold mirror 152 and the fourth sub-FOV 148 being redirected to pass through the second optically transmissive window 120 in a generally horizontal direction by a fold mirror 154. As with the previously described mirror arrangement, it is preferable that the mirrors used by the second imaging assembly 130 are arranged such that the distances, measured respectively along the third and fourth sub-FsOV, are substantially equivalent from the second imaging sensor to the point of intersection or to the points where respective centroidal axis are nearest each other in the product scanning region.

Further to the imaging assemblies, the PCB 126 also includes a first illumination assembly 156 and a second illumination assembly 158. Each of the illumination assemblies includes an illumination source (e.g., light emitting diode [LED]) configured to provide illumination over the respective FOV. That is, the first illumination assembly 156 is configured to provide illumination over the first FOV 132 and the second illumination assembly 158 is configured to provide illumination over the second FOV 134. Due to the reflective nature of the mirrors of the mirror arrangement, illumination light emitted by each of the illumination assemblies travels copathularly with the respective FsOV, ultimately illuminating the products that are presented in the product scanning region.

Further to the above, the PCB 126 includes a decode assembly 160 communicatively coupled to both imaging assemblies 128, 130. Data acquired by the imaging assemblies is transmitted to the decode assembly where it is processed and/or analyzed in an effort to detect and decode a valid barcode(s). Additionally, components like a controller for controlling the imaging assemblies, the illumination assemblies, and/or the decode assembly can also be installed on the PCB 126. Alternatively, such a controller may be positioned separate from the PCB. Signal data may be sent to/from the PCB 121 via interface connectors 162.

The embodiment of FIGS. 2 and 3 can be particularly advantageous as it may allow for full-featured functionality while having relatively few parts. That is, reader 106 may be implemented in a way where no other PCB(s) with imaging assemblies are provided. Such reduction in parts can lead to potential cost saving and increased reliability as less components can be subject to damage or fault. Additionally, the upright orientation of the existing PCB 126 allows a single imaging assembly to operate with two FsOV (in case of the first imaging assembly 128 these are the first sub-FOV 138 and the second sub-FOV 140) where those FsOV are directed through the reader's windows and into the product scanning region via only three mirrors (splitter mirror 136 splitting the original FOV 132 to produce a first and second FsOV, fold mirror 142 redirecting the first sub-FOV 138, and second fold mirror 144 redirecting the second sub-FOV 140). Moreover, the upright placement of the PCB 126 may reduce chances of liquid spills causing damage to circuit components relative to a PCB that is positioned horizontally in the lower region of the reader. This can be aided further by positioning the interface connectors on the PCB higher than they would be in a horizontally positioned PCB.

Figure 5:
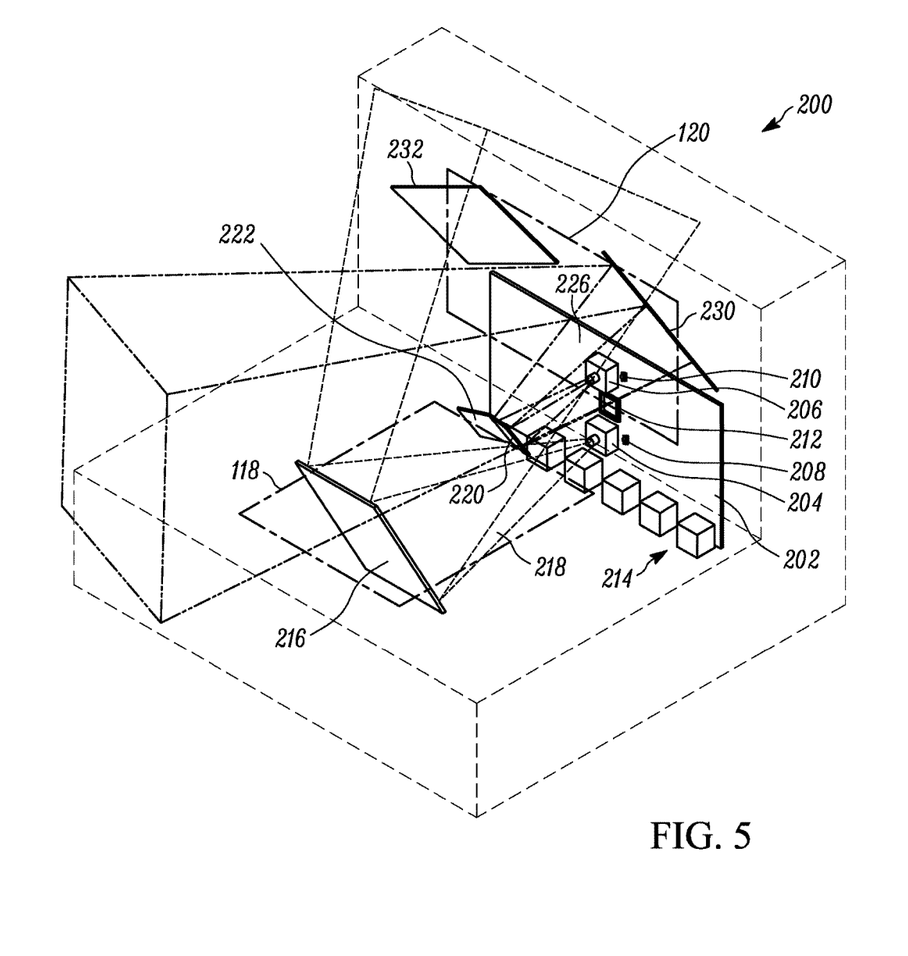
FIG. 5 illustrates a front right perspective view of a barcode reader in accordance with an embodiment of the present invention.
Figure 6:
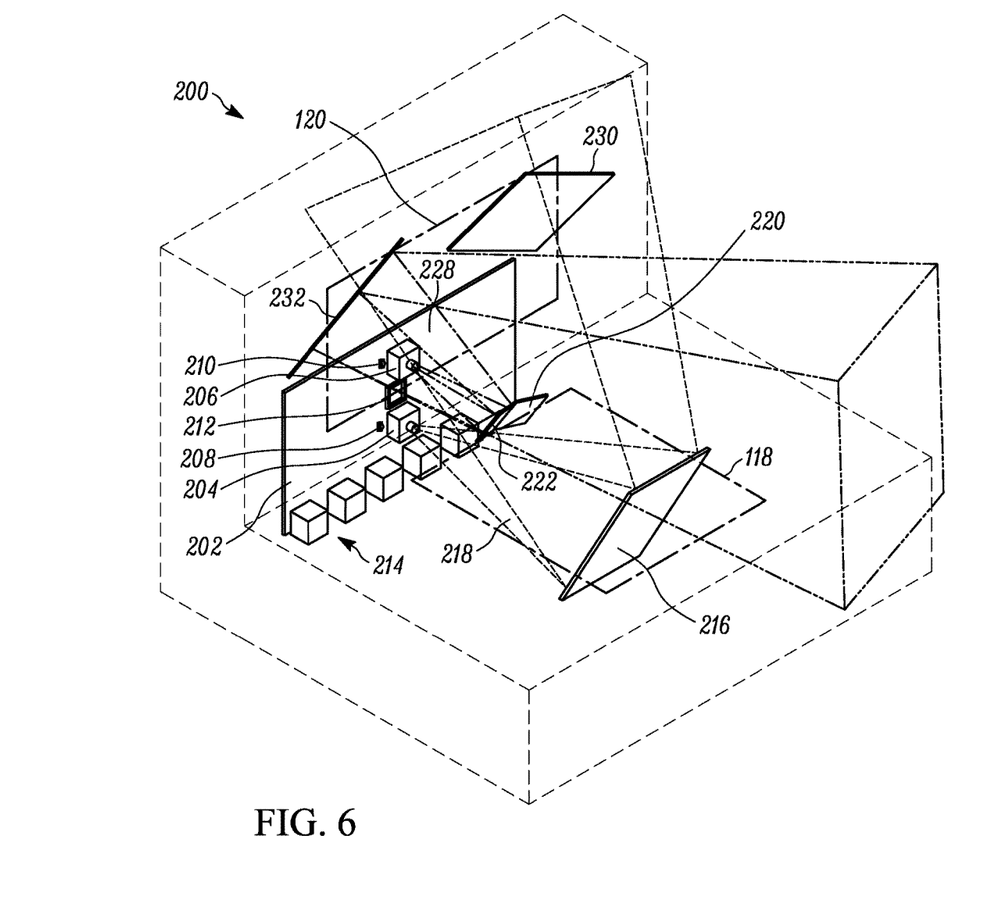
FIG. 6 illustrates a front left perspective view of the barcode reader of FIG. 6.
Figure 7:
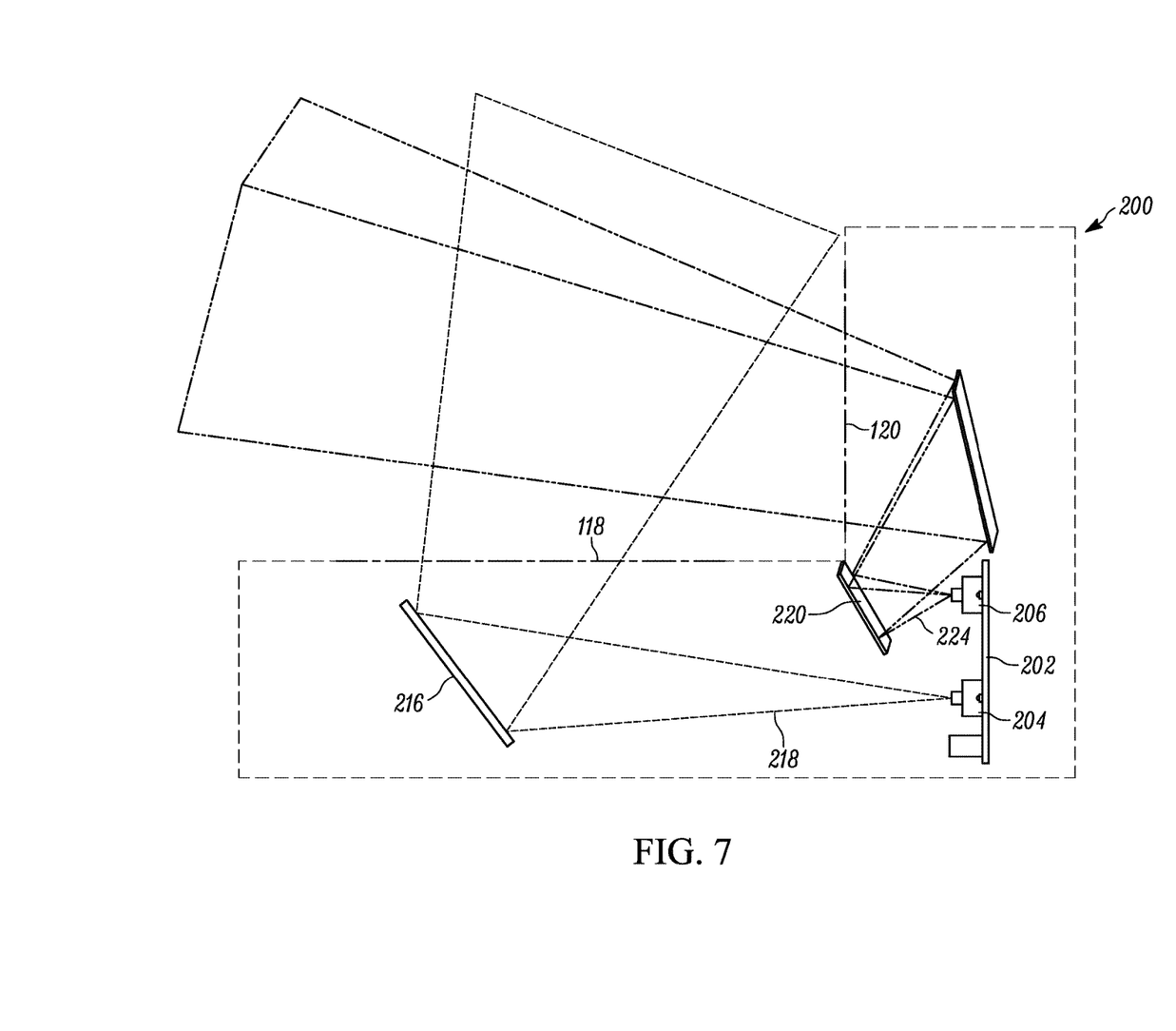
FIG. 7 illustrates a right side perspective view of the barcode reader of FIG. 6.

Referring now to FIGS. 5-7, shown therein is another embodiment of a component arrangement 200 for use in a barcode reader 106. As in the prior component arrangement 10, included is a upright positioned PCB 202 with first 204 and second 206 imaging assemblies having respective imaging sensors and FsOV, first 208 and second 210 illumination assemblies, and a decode assembly 212 communicatively coupled with the imaging assemblies 204 and 206. Additionally, as before, a controller may be provided on or off the PCB 202 for controlling the operation of PCB components, and communication with the PCB 202 can be established via communication connectors 214. It should be apparent that operation of the various components noted above is same/similar to the components of the prior component arrangement 10, with the primary difference in the arrangement 200 being the physical arrangement of the various elements, as further details below. Accordingly, detailed functionality or attributes of elements described previously may not be restated in the description of this embodiment.

Unlike the prior embodiment, where one imaging assembly captured image data from both generally horizontal and generally upright FsOV, the current embodiment uses one imaging assembly to capture image data from a generally upright FOV and another imaging assembly from a generally horizontal FOV. In particular, the arrangement uses a first fold mirror 216 to redirect a first FOV of the first imaging assembly 204 such that it is directed in a generally upright direction through the first optically transmissive window 118. Additionally, the arrangement uses splitter mirrors 220 and 222 to split a second FOV 224 of the second imaging assembly 206 into a first sub-FOV 226 and a second sub-FOV 228. The first sub-FOV 226 is redirected via a second fold mirror 230 and the second sub-FOV 228 is redirected via a third fold mirror 232 such that both first and second sub-FsOV 226, 228 pass through the second optically transmissive window 120 in a generally horizontal direction. As with the previous embodiment, the imaging assemblies and mirrors are arranged such that the first FOV 218, the first sub-FOV 226, and a second sub-FOV 228 intersect above the reader's top portion and in the product scanning region. Additionally, it is preferable for the distances traversed from the second imaging sensor to the point of intersection along fir first and second sub-FsOV to be approximately equal.

To enable the FOV coverage that may be desired in an embodiment, the first imaging assembly 204 along with its imaging sensor is oriented orthogonally relative to the second imaging assembly 206 along with its imaging sensor. In the currently described embodiment, the first imaging assembly 204 can be said to have a "portrait" orientation relative to the overall orientation of the barcode reader 10 and the second imaging assembly 206 can be said to have a "landscape" orientation relative to the overall orientation of the barcode reader 10.

Similar to the prior embodiment, the component arrangement 200 may enable a broad FOV coverage in the product scanning region while employing a relatively low number of components. That is, in an embodiment, reader 106 may be implemented with the component arrangement 200 in a way where no other PCB(s) with imaging assemblies are provided. Moreover, the mirror arrangement of such a reader 10 can similarly be limited such that only the described mirrors are used. Furthermore, as before, the upright placement of the PCB 202 may reduce chances of liquid spills causing damage to circuit components.

Additionally, it should be recognized that other configurations of the currently described component arrangements are considered to be within the scope of the present disclosure. For instance, in some embodiments, depending on the desired FOV coverage, more or less imaging assemblies and more or less mirrors may be used to direct the respective FsOV along desired paths as long as all the imaging assemblies are positioned on the same, substantially upright PCB. As such, the reader 10 may include a configuration where the upright-positioned PCB includes two imaging assemblies, each having a respective FOV, where at least a portion of each of the FsOV is be routed through at least one of the substantially horizontal and substantially upright windows.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

We claim:

1. A barcode reader for use in a checkout workstation having a surface for placement of products to be checked out, the barcode reader comprising:
   a lower housing portion having a top portion;
   a first optically transmissive window positioned in the top portion of the lower housing, a top surface of the first optically transmissive window defining a horizontal plane, the top portion of the lower housing being substantially parallel with the surface of the checkout workstation when the barcode reader is used in the checkout workstation;

a raised housing portion having a second optically transmissive window, the raised housing portion extending at least partially above the top portion of the lower housing; and a printed circuit board (PCB) positioned substantially upright relative to the horizontal plane, the PCB having a first imaging assembly and a decode assembly, the barcode reader having no other printed circuit board with another imaging assembly.

2. The barcode reader of claim 1, further comprising a mirror arrangement, wherein the first imaging assembly includes a first imaging sensor having a first field of view (FOV), and wherein the mirror arrangement is configured to split the first FOV into a first sub-FOV and a second sub-FOV, and wherein the mirror arrangement is further configured to redirect the first sub-FOV through the first optically transmissive window and the second sub-FOV through the second optically transmissive window.

3. The barcode reader of claim 2, wherein the mirror arrangement is configured to redirect the first sub-FOV through the first optically transmissive window and the second sub-FOV through the second optically transmissive window such that the first sub-FOV and the second sub-FOV intersect above the top portion of the lower housing.

4. The barcode reader of claim 3, wherein a first distance, measured along the first FOV and the first sub-FOV, from the first imaging sensor to an intersection of the first sub-FOV and the second sub-FOV is approximately equal to a second distance, measured along the first FOV and the second sub-FOV, from the first imaging sensor to the intersection of the first sub-FOV and the second sub-FOV.

5. The barcode reader of claim 4, wherein:
the first sub-FOV extends along a first central axis;
the second sub-FOV extends along a second central axis;
the intersection of the first sub-FOV and the second sub-FOV is a point of intersection between the first central axis and the second central axis;
the first distance is measured along the first central axis; and
the second distance is measured along the second central axis.

6. The barcode reader of claim 2, wherein:
the first imaging sensor includes a plurality of photosensitive elements defining a substantially flat surface;
the first sub-FOV includes a first central axis with a first point in a product-scanning region;
the second sub-FOV includes a second central axis with a second point in the product-scanning region, the first point being nearest the second central axis in the product-scanning region, the second point being nearest the first central axis in the product-scanning region; and
a first distance, measured along the first central axis, from the substantially flat surface of the imaging sensor to the first point is substantially equal to a second distance, measured along the second central axis, from the substantially flat surface of the imaging sensor to the second point.

7. The barcode reader of claim 2, wherein the PCB further includes a first illumination assembly, and
wherein the mirror arrangement is further configured to reflect illumination provided by the first illumination assembly such that at least a portion of the illumination provided by the first illumination assembly is reflected through the first optically transmissive window and at least another portion of the illumination provided by the first illumination assembly is reflected through the second optically transmissive window.

8. The barcode reader of claim 2, wherein the mirror arrangement is configured to redirect the first sub-FOV through the first optically transmissive window via only a first mirror, and wherein the mirror arrangement is further configured to redirect the second sub-FOV through the second optically transmissive window via only a second mirror and a third mirror, the redirecting the second sub-FOV including splitting the second sub-FOV from the first FOV.

9. The barcode reader of claim 8, wherein the PCB includes a second imaging assembly with a second imaging sensor having a second FOV, and wherein the mirror arrangement is further configured:
to split the second FOV into a third sub-FOV and a fourth sub-FOV,
redirect the third sub-FOV through the first optically transmissive window via only a fourth mirror, and
redirect the fourth sub-FOV through the second optically transmissive window via only a fifth mirror and a sixth mirror, the redirecting the fourth sub-FOV including splitting the fourth sub-FOV from the second FOV.

10. The barcode reader of claim 2, wherein the mirror arrangement is positioned statically relative to the lower housing portion and the raised housing portion.

11. The barcode reader of claim 1, further comprising a mirror arrangement, wherein the first imaging assembly includes a first imaging sensor having a first field of view (FOV),
wherein the PCB includes a second imaging assembly with a second imaging sensor having a second FOV, and
wherein the mirror arrangement is configured to redirect the first FOV through the first optically transmissive window and the second FOV through the second optically transmissive window.

12. The barcode reader of claim 11, wherein the mirror arrangement is configured to redirect the first FOV through the first optically transmissive window and the second FOV through the second optically transmissive window such that the first FOV and the second FOV intersect above the top portion of the lower housing.

13. The barcode reader of claim 11, wherein the mirror arrangement is configured to redirect the first FOV through the first optically transmissive window via only a first mirror, and wherein the mirror arrangement is further configured to:
split the second FOV into a first sub-FOV and a second sub-FOV;
redirect the first sub-FOV through the second optically transmissive window via only a second mirror and a third mirror; and
redirect the second sub-FOV through the second optically transmissive window via only a fourth mirror and a fifth mirror, redirecting the first sub-FOV and second sub-FOV including splitting the second FOV.

14. The barcode reader of claim 11, wherein the first imaging sensor is oriented orthogonally relative to the second imaging sensor.

15. The barcode reader of claim 1, wherein:
the PCB further includes a second imaging assembly;
the first imaging assembly includes a first FOV;
the second imaging assembly includes a second FOV;
at least a portion of the first FOV is directed to pass through at least one of the first optically transmissive window and the second optically transmissive window; and
at least a portion of the second FOV is directed to pass through at least one of the first optically transmissive window and the second optically transmissive window.

16. The barcode reader of claim 1, wherein the top portion of the lower housing includes a platter.

17. The barcode reader of claim 16, wherein the platter is one of removeable and non-removeable.

18. A bi-optic barcode reader comprising:
a lower housing portion having a top portion with a generally horizontal window;
a raised housing portion having a generally upright window;
a printed circuit board (PCB) positioned substantially upright relative to the generally horizontal window, the PCB having an imaging assembly with a first FOV and a decode assembly, the bi-optic barcode reader having no other printed circuit board with another imaging assembly; and
a mirror arrangement configured to split the first FOV into a first sub-FOV and a second sub-FOV, redirect the first sub-FOV through the generally horizontal window, and redirect the second sub-FOV through the generally upright window.

19. The bi-optic barcode reader of claim 18, wherein the mirror arrangement redirects the first sub-FOV through the generally horizontal window via only a first mirror, and
wherein the mirror arrangement further redirects the second sub-FOV through the generally upright window via only a second mirror and a third mirror, the redirecting the second sub-FOV including splitting the second sub-FOV from the first FOV.

20. A bi-optic barcode reader comprising:
a lower housing portion having a top portion with a generally horizontal window;
a raised housing portion having a generally upright window;
a printed circuit board (PCB) positioned substantially upright relative to the generally horizontal window, the PCB having a first imaging assembly with a first FOV and a second imaging assembly with a second FOV, the bi-optic barcode reader having no other printed circuit board with another imaging assembly; and
a mirror arrangement configured to:
redirect the first FOV through the generally horizontal window;
split the second FOV into a first sub-FOV and a second sub-FOV with two splitter mirrors positioned directly within the optical path of the second imaging assembly; and
redirect the first sub-FOV and the second sub-FOV through the generally upright window.

21. The bi-optic barcode reader of claim 20, wherein the mirror arrangement:
redirects the first FOV through the generally horizontal window via only a first mirror;
splits the first sub-FOV from the second FOV and redirects the first sub-FOV through the generally upright window via only a second mirror and a third mirror; and
splits the second sub-FOV from the second FOV and redirects the second sub-FOV through the generally upright window via only a fourth mirror and a fifth mirror.

* * * * *